US012375182B2

(12) United States Patent
Pelc et al.

(10) Patent No.: US 12,375,182 B2
(45) Date of Patent: Jul. 29, 2025

(54) INTERFERENCE DEVICES FOR WAVELENGTH LOCKING

(71) Applicant: Apple Inc., Cupertino, CA (US)

(72) Inventors: Jason S. Pelc, Sunnyvale, CA (US); Mark Alan Arbore, Los Altos, CA (US); Yi-Kuei Wu, San Jose, CA (US)

(73) Assignee: APPLE INC., Cupertino, CA (US)

( * ) Notice: Subject to any disclaimer, the term of this patent is extended or adjusted under 35 U.S.C. 154(b) by 386 days.

(21) Appl. No.: 17/945,862

(22) Filed: Sep. 15, 2022

(65) Prior Publication Data
US 2023/0100317 A1    Mar. 30, 2023

Related U.S. Application Data

(60) Provisional application No. 63/248,195, filed on Sep. 24, 2021.

(51) Int. Cl.
*H04B 10/572* (2013.01)
*G02B 6/42* (2006.01)
*H04B 10/079* (2013.01)

(52) U.S. Cl.
CPC ......... *H04B 10/572* (2013.01); *G02B 6/4215* (2013.01); *H04B 10/07957* (2013.01)

(58) Field of Classification Search
CPC ............ H04B 10/572; H04B 10/07957; H04B 10/506; G02B 6/4215; G02B 6/14; H04J 14/0201
See application file for complete search history.

(56) References Cited

U.S. PATENT DOCUMENTS 6,236,782 B1 * 5/2001 Kewitsch ........... G02B 6/02133
                                                         385/48
6,487,336 B1    11/2002 Yao
(Continued)

FOREIGN PATENT DOCUMENTS

CN    113218518    8/2021
JP    H04353804    2/1992
(Continued)

OTHER PUBLICATIONS

Anonymous, "Multi mode Interferometer," Wikipedia, retrieved from https://en.wikipedia.org/w/index.php?title=Multi_mode_interferometer&oldid=1024100316, May 20, 2021, 2 pages.
(Continued)

*Primary Examiner* — Hibret A Woldekidan
(74) *Attorney, Agent, or Firm* — Brownstein Hyatt Farber Schreck, LLP

(57) ABSTRACT

Configurations for a modal interference device used for wavelength locking are disclosed. The modal interference device may be an interference device that includes an input waveguide, an interference waveguide, and an output waveguide. A fundamental mode of light may be launched into the input waveguide and the interference waveguide may receive the fundamental mode and generate a higher order mode of light, where the two modes of light may be superimposed while propagating through the interference waveguide. The two modes of light may be received at an output waveguide that collapses the two modes into a single mode and generates an output signal corresponding to the interference between the two modes of light. The output signal may be used to wavelength lock a measured wavelength to a target wavelength. The multiple output waveguides may produce output signals that have dead zones that
(Continued)

do not align with one another for any wavelength in the wavelength range of interest.

15 Claims, 10 Drawing Sheets

(56) References Cited

U.S. PATENT DOCUMENTS

| | | | |
|---|---|---|---|
| 6,782,017 B1* | 8/2004 | Kai | H01S 5/0687 |
| | | | 372/18 |
| 7,333,690 B1 | 2/2008 | Peale et al. | |
| 7,555,220 B2 | 6/2009 | Grubb et al. | |
| 8,559,775 B2 | 10/2013 | Babie et al. | |
| 8,626,261 B2 | 1/2014 | Ko et al. | |
| 8,818,148 B2 | 8/2014 | Boudreau et al. | |
| 8,983,250 B2 | 3/2015 | Black et al. | |
| 9,020,004 B2 | 4/2015 | Jeong | |
| 9,110,259 B1 | 8/2015 | Black | |
| 9,348,154 B2 | 5/2016 | Hayakawa | |
| 9,620,931 B2 | 4/2017 | Tanaka | |
| 9,768,907 B2 | 9/2017 | Hironishi | |
| 9,835,881 B2 | 12/2017 | Guzzon | |
| 9,964,703 B2 | 5/2018 | Parker et al. | |
| 10,349,492 B2 | 7/2019 | Sugiyama | |
| 10,481,333 B2 | 11/2019 | Soda | |
| 10,534,189 B2 | 1/2020 | Miller | |
| 11,064,592 B1 | 7/2021 | Bismuto et al. | |
| 11,394,464 B2 | 7/2022 | Nagarajan | |
| 2003/0091265 A1* | 5/2003 | Lin | G02B 6/12033 |
| | | | 385/27 |
| 2004/0105677 A1* | 6/2004 | Hamada | G02F 1/313 |
| | | | 398/79 |
| 2007/0223552 A1 | 9/2007 | Muendel et al. | |
| 2008/0266639 A1 | 10/2008 | Melloni et al. | |
| 2011/0182082 A1* | 7/2011 | Ide | H01S 5/147 |
| | | | 362/553 |
| 2014/0340690 A1 | 11/2014 | Lefevre | |
| 2019/0018263 A1* | 1/2019 | Hassan | G02F 1/2257 |
| 2021/0132401 A1* | 5/2021 | Zeng | G02B 6/125 |
| 2021/0345468 A1 | 11/2021 | Bismuto et al. | |
| 2023/0062578 A1 | 3/2023 | Mahmoud et al. | |

FOREIGN PATENT DOCUMENTS

| | | |
|---|---|---|
| JP | 2015068854 | 4/2015 |
| JP | 2015532848 | 11/2015 |
| JP | 2020112450 | 7/2020 |
| JP | 2020118887 | 8/2020 |
| WO | WO 14/129613 | 8/2014 |
| WO | WO 19/214244 | 11/2019 |
| WO | WO 20/039553 | 2/2020 |

OTHER PUBLICATIONS

Cai et al., "Analysis of the Coupling Characteristics of a Tapered Three-Guide Coupled System," *Journal of Lightwave Technology*, IEEE, USA, vol. 8, No. 10, Oct. 1, 1990, pp. 1621-1629.

Vance et al., "Design procedures for passive planar coupled waveguide devices," IEE Proceedings: Optoelectronics, Institution of Electrical Engineers, Stevenage, GB, vol. 141, No. 4, Aug. 1, 1994, pp. 231-241.

Yuanmin et al., "Analysis of the Coupling Characteristics of a Tapered Three-Guide Coupled System," *Journal of Lightwave Technology*, Oct. 1990, vol. 8, No. 10, pp. 1621-1629.

He et al., "Integrated Polarization Compensator for WDM Waveguide Demultiplexers," IEEE Photonics Technology Letters vol. 11, No. 2, Feb. 1999, pp. 224-226.

* cited by examiner

INTERFERENCE DEVICES FOR WAVELENGTH LOCKING

CROSS-REFERENCE TO RELATED APPLICATIONS

This application claims the benefit under 35 U.S.C. § 119(e) of U.S. Provisional Patent Application No. 63/248,195, filed Sep. 24, 2021, the contents of which are incorporated herein by reference in their entirety.

FIELD

This disclosure relates generally to wavelength locking systems. More particularly, embodiments herein relate to wavelength locking systems with waveguides that generate output signals using modal interference that are used to wavelength lock light sources.

BACKGROUND

Generally, optical systems employ multiple light sources to measure various types of information. In some instances, it may be useful to monitor the optical properties of the light emitted by the light sources. For example, the optical properties of the light emitted by the light sources can be measured and monitored to ensure that a light source has a certain degree of wavelength stability. Further, wavelength locking may be achieved when dealing with a single wavelength or a small wavelength range, but increases in complexity for multiple wavelengths or a wavelength range spanning a greater number of wavelengths.

Some of these optical systems may output light at multiple different wavelengths. However, as the number of monitored wavelengths increase, the size and complexity of the system increase as well. Due to the scaling of the size of the optical system with the number of wavelength locked wavelengths, the optical systems used for monitoring light may not be suitable for certain applications due to factors such as size and complexity. As one example, such optical systems may take up too much space to be reasonably incorporated into compact electronic devices, such as mobile phones, tablet computing devices, laptops, wearables, and the like. Additionally, existing optical systems for monitoring light may function over a narrow wavelength range and may not operate in different or broad wavelength ranges. Accordingly, it may be desirable to employ a system for locking the wavelengths of light across a large wavelength range while maintaining a compact form factor for incorporation in compact electronic devices.

SUMMARY

Embodiments of the systems, devices, methods, and apparatuses described in the present disclosure are directed to an interference device used for wavelength locking. Also described are systems, devices, methods, and apparatuses directed to using waveguide modes to generate output signals that may be used to wavelength lock light over a broadband wavelength range of light while reducing the size and complexity of the interference device. An input waveguide may receive and output a single mode of light. An interference waveguide may receive the single mode of light and may generate at least one higher order mode of light. The multiple modes of light may be superimposed and propagate through the interference waveguide. The light may be collapsed back into a single mode to generate an output signal used to wavelength lock a measured wavelength to a target wavelength of light. In some embodiments, multiple output signals may be generated between multiple modes of light, which may be used to wavelength lock light over a broadband wavelength range of light.

The present disclosure describes a wavelength locking device. The wavelength locking device may include a slab waveguide defining a first waveguide configured to receive light and support a first single mode of light, a second waveguide with a first end optically coupled to the first waveguide and configured to receive the first single mode of light from the first waveguide and support at least two different modes of light, and a third waveguide optically coupled to a second end of the second waveguide and configured to receive the at least two different modes of light from the second waveguide, support a second single mode of light, and output the second single mode of light to wavelength lock a measured wavelength of light to a target wavelength. The first waveguide has a first width, has a first center axis, and is offset from a center axis of the second waveguide, the second waveguide has a second center axis, has a second width different than the first width, is a bimodal waveguide, and the third waveguide has a third center axis, has a third width different than the second width, and the third center axis is offset from the center axis of the second waveguide, thereby increasing sensitivity to a selected mode of the at least two different modes of light. In some embodiments, at least a first mode size of the first single mode of light and a second mode size of the at least two different modes of light are constant across different wavelengths of light. In some embodiments, the first waveguide and the third waveguide are tapered waveguides. In some embodiments, the second waveguide is an interference waveguide and the second waveguide generates a TE00 mode of light superimposed with a TE01 mode of light. In some embodiments, the first waveguide is positioned so that a center axis of a first end of the second waveguide aligns with a center axis of the first waveguide and the third waveguide is positioned so that a center axis of a second end of the second waveguide aligns with a center axis of the third waveguide.

Additionally, the second waveguide is an interference waveguide and the second waveguide generates a TE00 mode of light superimposed with a TE02 mode of light. In some embodiments, the second waveguide supports at least three different modes of light. In some embodiments, the second waveguide may include a first end of a mode expander section optically coupled to the second waveguide and three output waveguides optically coupled to a second end of the mode expander section. In some embodiments, the mode expander section allows adiabatic expansion of the at least three different modes of light, the at least three different modes of light interfere to provide three output signals with wavelength relationships that are phase shifted from one another, and two output waveguides of the three output waveguides are positioned asymmetrically relative to a center of the second end of the second waveguide. In some embodiments, the at least three different modes of light are a TE00 mode of light, a TE01 mode of light, and a TE02 mode of light, a first output waveguide of the three output waveguides is placed at a null of the TE02 mode of light, and the first output waveguide and a third output waveguide are positioned asymmetrically with respect to each other.

In some embodiments, a wavelength locking system may include a first waveguide configured to receive light and support a first single mode of light, a second waveguide with a first end optically coupled to the first waveguide and configured to receive the first single mode of light from the first waveguide and support at least two different modes of light, a mode separator optically coupled to a second end of the second waveguide and configured to separate the at least two different modes of light, output a first mode of light of the at least two different modes of light, and output a second mode of light of the at least two different modes of light, and an splitter configured to generate multiple output signals with wavelength relationships that are phase shifted relative to one another, where the multiple output signals are used to wavelength lock a measured wavelength of light to a target wavelength. The first waveguide is positioned so that a center axis is offset relative to a center axis of a first end of the second waveguide thereby generating at least two modes of light in the second waveguide and reducing insertion loss, the second waveguide receives the first mode of light and generates the second mode of light, outputs a combined first mode of light and the second mode of light, and the splitter has two waveguide inputs and three waveguide outputs. In some embodiments, the first waveguide is configured to receive a fundamental mode of light and the first waveguide is narrower than the second waveguide. Additionally, the splitter generates three output signals and each of the three output signals has a wavelength relationship with a unique phase shift dependent on wavelengths of the corresponding output signal. Further, the splitter may include a free propagation region having an output end and a first output waveguide with a center axis positioned so that a center axis of an output end of the free propagation region is aligned with the center axis of the first output waveguide. Also, the wavelength locking device may include a second output waveguide with a center axis positioned at the output end and symmetrically with respect to a central axis of the free propagation region and a third interference output waveguide with a center axis positioned at the output end and symmetrically with respect to the central axis of the free propagation region.

Additionally, a method for wavelength locking may include receiving, by a first waveguide, a first mode of light, receiving, by a second waveguide, the first mode of light, generating, by the second waveguide, a second mode of light, generating an output signal corresponding to the interference between the first mode of light and the second mode of light, and using the output signal to wavelength lock a measured wavelength of light to a target wavelength. Generating the output signal may include generating a first output signal corresponding to the interference between a TE00 mode of light and a TE01 mode of light, generating a second output signal corresponding to the interference between the TE00 mode of light and a TE02 mode of light, and generating a third output signal corresponding to the interference between the TE01 mode of light and the TE02 mode of light. In some embodiments, the method may include collapsing, by a third waveguide, the first mode of light and the second mode of light into a single mode of light. In still further embodiments, the method may include superimposing, by the second waveguide, the first mode of light and the second mode of light while the first and second modes of light propagate through the second waveguide.

In addition to the example aspects and embodiments described above, further aspects and embodiments will become apparent by reference to the drawings and by study of the following description.

Figure 1:
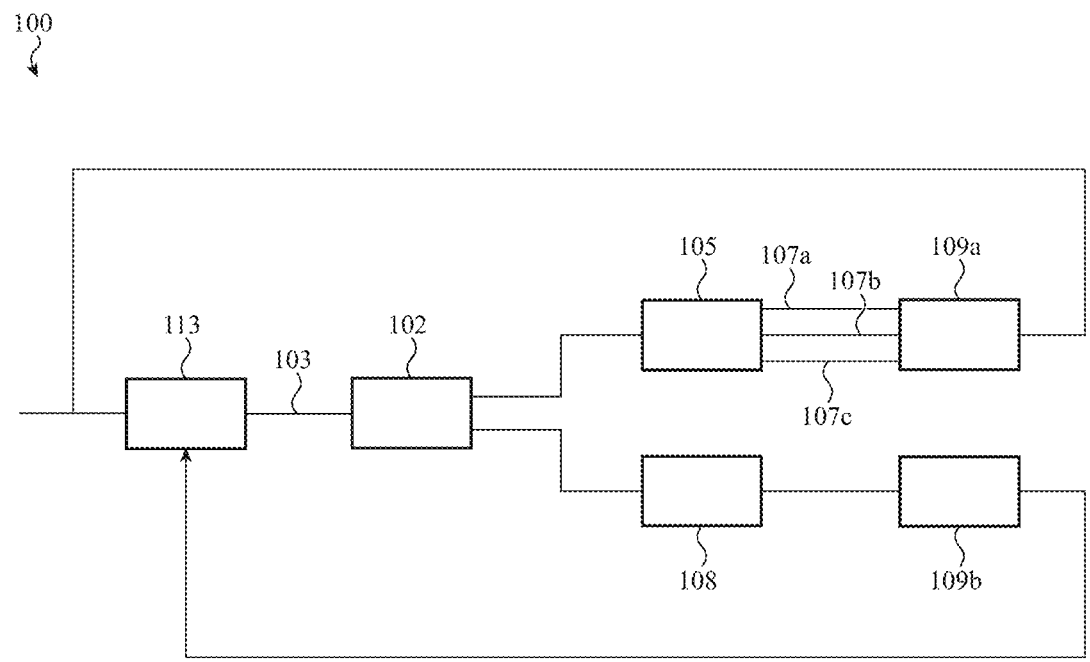
FIG. 1 illustrates a block diagram of an example wavelength locking system.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

It should be understood that the proportions and dimensions (either relative or absolute) of the various features and elements (and collections and groupings thereof) and the boundaries, separations, and positional relationships presented between them, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

As used herein, two elements that are "optically coupled" to one another may allow light to pass from one element to the other element.

In the following description of examples, reference is made to the accompanying drawings which show, by way of illustration, specific examples that can be practiced. It is to be understood that other examples can be used and structural changes can be made without departing from the scope of the various examples.

Disclosed herein is an integrated photonics system that includes an on-chip wavelength locking system operative to wavelength lock a light source (or multiple light sources) to a target wavelength or range of wavelengths. Although systems exist that may be used for wavelength locking, they may be limited to functioning in a narrow wavelength range (such as 50 nanometers), may introduce unaccounted for phase shifts, may have high optical loss, may be too large for integration into an electronic device (such as a mobile or wearable device), and so forth. Wavelength locking may be used in various photonics applications including, but not limited to, telecommunications, medical devices, spectroscopy, and the like. Maintaining wavelength accuracy in photonics applications may be important for accurate data collection and wavelength locking may prevent undesirable deviations in emitted wavelengths of light.

When a photonics system comprises a plurality of different light sources (at least some of which may emit light at different wavelengths), it may be desirable to lock each light source to a respective wavelength. There are various ways to design wavelength locking systems and different factors may be taken into consideration, such as size of the constituent components, phase differences introduced into the light by the components of the wavelength locking system, the range of wavelengths across which the wavelength locking system is intended to operate, temperature sensitivity, any combination of the foregoing, and so forth.

In general, the wavelength locking systems described herein may receive input light (e.g., generated by a light source) of a single mode and modify this input light from single mode light to multi-mode light. Modifying the light into multiple modes of light may result in modal interference to produce an output signal that may change intensity as a function of wavelength. This wavelength-dependent intensity change may allow the wavelength locking system to lock the wavelengths of a set of light sources (e.g., a tunable light source, multiple light sources, or the like) that span a broad wavelength range.

To facilitate the modal interference, the wavelength locking systems described herein include one or more interference waveguides that output signals having such a wavelength relationship. These output signals may be used by the wavelength locking system for monitoring and/or wavelength locking a wavelength of one or more light sources to a target wavelength. The interference waveguides may convert wavelength changes to intensity changes as a result of interference of multiple spatial modes of the same interference waveguide. Wavelength locking and how it is achieved is described in further detail herein with reference to FIG. 1.

A given output of an interference waveguide will have a relationship between wavelength and intensity, such that the intensity varies as a function of wavelength. As used herein, a "working zone" is a wavelength range of a single output signal from an interference waveguide where the single output signal has a slope of the wavelength-intensity relationship that is not zero, or substantially close to zero. The working zone typically comprises the region of the signal surrounding the largest slope values for the output signal (positive and negative).

Further, a "dead zone" is a wavelength range of a single output signal where the single output signal has a slope of the wavelength-intensity relationship that is zero or close to zero, such as at and around the peaks and troughs of the wavelength relationship. Put another way, the working zone is any part of the single output signal that is not a dead zone. Accordingly, points in the working zone have higher slopes than points in the dead zone. As a result, a given increment of wavelength change will result in a larger intensity change in working zones than in dead zones. When the output signal has a sinusoidal wavelength relationship (i.e., the intensity of the output signal varies sinusoidally as a function of wavelength), the output signals may alternate between dead zones (at peaks and valleys) and working zones (between adjacent peaks and valleys) across a range of wavelengths. It should be appreciated that the exact cutoff between a dead zone and a working zone may be dependent on the overall system requirements.

As described herein, in areas of the output signal where the slope is close to zero or zero, it may be difficult to discern small changes in wavelength (because these small changes result in relative small changes to the intensity of the output signal), which in turn may limit the accuracy of wavelength locking based on the output signal. By contrast, the wavelength locking device may operate more effectively in the working zone, since the output signal has a large slope and deviations between the target wavelength and the measured wavelength will result in large intensity differences in the output signal differences (as compared to similar deviations occurring in a dead zone).

To help mitigate this, the wavelength locking system described herein may use multiple output signals, where each output signal may have a different wavelength relationship. For example, the output signals may each have a sinusoidal wavelength relationship, but each wavelength relationship may have a different phase (such that intensity peaks and valleys align with certain wavelengths). The relative phase difference between the wavelength relationships may be selected to minimize overlap between the dead zones of the wavelength relationships of different outputs. Although each of the multiple output signals may have a slope at some point that is zero or close to zero, the dead zones of each output may fall at different points in the wavelength range, thus at least one output signal of the multiple output signals may have a slope that is not zero (i.e., not in a "dead zone"). For example, in instances where there are three outputs, the three outputs may be designed to a 120 degree phase difference between the wavelength relationship for each output. With a 120 degree phase difference between each of the wavelength relationships, at least one output will be in the middle of its working zone for every wavelength across a range of input wavelengths.

The wavelength locking devices described here may produce these multiple output signals having wavelength relationships with a constant phase difference over a wavelength range of interest may be relatively small in size and low complexity while still able to accurately determine the difference between measured wavelength and target wavelength of the signal. This determined difference can be used for wavelength locking. Using the output signals for wavelength locking will be described in further detail with reference to FIG. 1. Although the wavelength range is discussed herein as spanning one micron, it may be smaller or larger (such as 100 nanometers, 500 nanometers, or 1.3 microns, and so on). The dead zones of the output signals may not align with one another in this one micron wavelength range. Put another way, a wavelength locking may be achieved at any wavelength in this range at least in part because of the consistent or mostly consistent phase difference between the wavelength relationships of the outputs of the interference devices.

As used throughout this specification, a reference number without an alpha character following the reference number can refer to one or more of the corresponding references, the group of all references, or some of the references. For example, "645" can refer to any one of the output 645 (e.g., output 645a, output 645b, etc.), can refer to all of the outputs 645, or can refer to some of the outputs (e.g., both output 645a, output 645b) depending on the context in which it is used.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

These and other embodiments are discussed below with reference to FIGS. 1-8. However, those skilled in the art will readily appreciate that the detailed description given herein with respect to these Figures is for explanatory purposes only and should not be construed as limiting.

FIG. 1 illustrates a block diagram of an example wavelength locking system 100 that includes light source(s) 113, splitter 102, interference device(s) 105, power monitor 108, and controllers 109a and 109b. The light source(s) 113 emits input light along light path 103 to the splitter 102. The splitter 102 splits the input light received on an input light path 103 and passes the split light to the interference device(s) 105 and the power monitor 108. Generally, light paths may be waveguides, optical fibers, free space optics, or other elements that may pass light. In the embodiment of FIG. 1, the light path 103 is a waveguide, though the alternatives to waveguides may be used in the larger system for coupling light into the wavelength locking system 100. In some embodiments, the wavelength locking system 100 may include additional splitters that provide light to interference devices or other components. In other embodiments, the wavelength locking system 100 may include interference devices and/or may not include additional splitters. These embodiments are described in further detail with reference to FIGS. 2A-8.

Generally as described herein, a wavelength locking system may include the components for wavelength locking including one or more of one or more light sources, one or more wavelength locking devices, one or more splitters, one or more interference devices, one or more photodiodes that convert the outputs of light into electrical signals, one or more controllers, one or more power monitors, any combination thereof, and so forth. The one or more wavelength locking devices may include one or more of one or more splitters, one or more interference devices, one or more photodiodes, one or more power monitors, one or more controllers, any combination thereof, and so forth. Further, the one or more wavelength devices may receive light, split light, and output one or more interference based outputs, which each may have an intensity with a different wavelength relationship (where the one or more outputs may be generated by one or more interference devices). Additionally, the one or more interference devices may include cladding layers or interference waveguides, and may be capable of outputting one or more interference-based outputs. Put another way, the interference waveguide may be a waveguide within the interference device where the interference may occur.

Additionally, the wavelength locking system 100 includes a power monitor 108, but the power monitor 108 (and with it, splitter 102) may be optional and not included in the wavelength locking system 100 in other embodiments. The power monitor 108 may receive light from the splitter 102 and pass the power signal to controller 109b. The controller 109b may determine whether the light sources are outputting a predetermined power and pass a signal back to the light source(s) 113 to adjust the power if needed. The functionality of the power monitor 108 and the controllers 209a and 209b are described with reference to FIGS. 2A, 2B, and 3.

In some embodiments, the interference device(s) 105 may be one or more devices (e.g., three interference devices as discussed in FIGS. 2A, 2B, and 3) and may produce output signals (e.g., output light) on light paths 107a, 107b, and 107c. The output signals may be produced by interfering modes of light propagating in the interference waveguides in the interference devices. The interference waveguides produce output signals, each of which has a constant intensity when the wavelength of light is fixed. As mentioned above, this intensity is wavelength dependent, such that each output signal will have a sinusoidal wavelength relationship as discussed previously, but with different relative phases. In this way, the dead zones may not align with one another for the outputs of any wavelength in the wavelength range of light inputted by the light source(s) 113. The output signals may be transmitted to the controller 109a, which measures the relative intensity of each output.

Specifically, the output signals may be used to measure any discrepancy between a wavelength of light (i.e., generated by a light source and received by a wavelength locking system) and a target wavelength. Specifically, the target wavelength will have an expected intensity for each of the output signals. The differences between the measured intensities and these expected intensities are indicative of the discrepancy between the measured wavelength and the target wavelength. Accordingly, the measured intensities may be used to determine the wavelength of the measured light or changes in the wavelength of the measured light. Additionally or alternatively, these measured intensities may be used to generate a feedback signal that is used to control the operation of the light source to alter the wavelength of the generated light, and thereby lock it to the target wavelength. In this way, controller 109a may determine whether a given light source 113 is outputting light at the target wavelength, and may pass a signal back to the light source(s) 113 to adjust the emitted wavelength if needed. In some variations of the wavelength locking systems described herein, the output signals may be used to measure and monitor the wavelength of light generated by a light source and received by a wavelength locking system without using this information as feedback to actively control the wavelength of the light source.

Figure 2A:
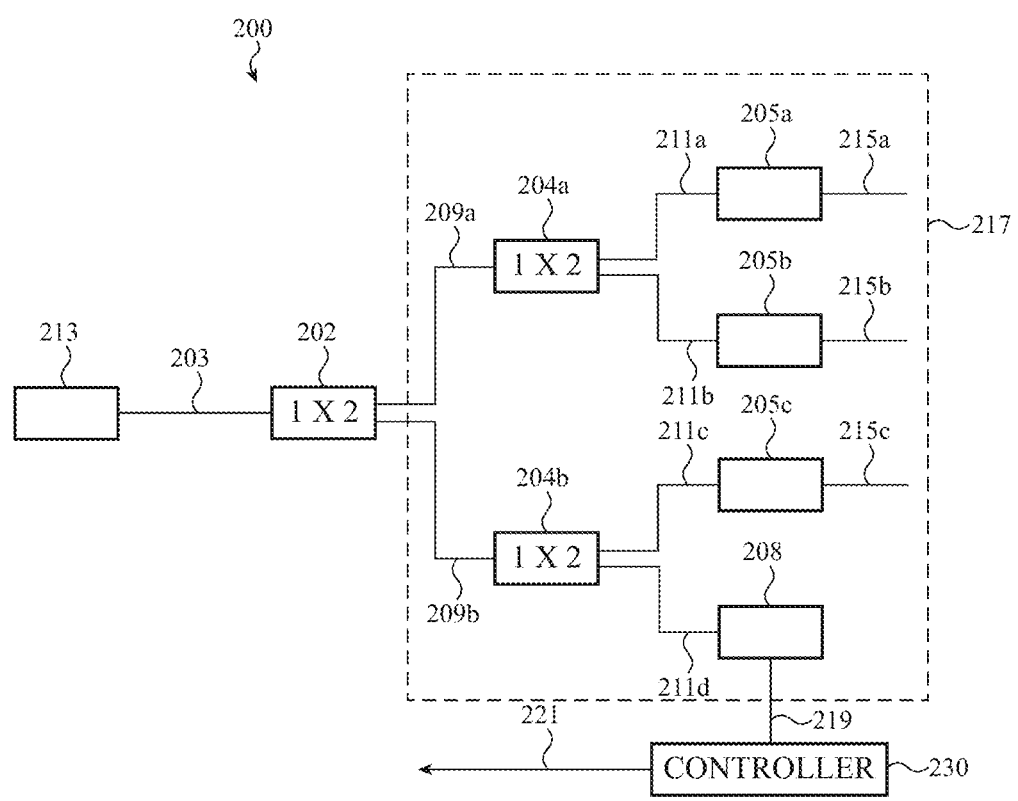
FIG. 2A illustrates a block diagram of an example wavelength locking system including multiple interference devices.

FIG. 2A illustrates a block diagram of an example wavelength locking system including multiple interference devices. The wavelength locking system 200 may generally include a light source 213, a splitter 202, a wavelength locking device 217, and a power monitor 208. The individual components of the wavelength locking system 200 may be a light source 213, splitters 202, 204a, and 204b, interference devices 205a, 205b, and 205c, a power monitor 208 and a controller 230. The interference devices 205a, 205b, 205c, splitters 202, 204a, 204b, and the power monitor 208 may be included in the wavelength locking device 217. As shown in FIG. 2A, the splitters 202, 204a, and 204b are one by two (1×2) light splitters; however, any appropriate component or combination of components may be used to achieve similar optical splitting functionality. The splitters 202, 204a, and 204b may split the received light between two output light paths. The interference devices 205a, 205b, 205c may function similarly to the interference device(s) 105 as described in FIG. 1.

In FIG. 2A, the splitter 202 receives input light on light path 203 from one or more light sources 213. The splitter 202 splits the input light and passes the split light to splitters 204a, 204b on light paths 209a, 209b respectively. The splitters 204a, 204b both split light and pass light along light paths 211a, 211b, 211c to the interference devices 205a, 205b, 205c, respectively. That is, splitter 204a passes light to interference devices 205a, 205b via light paths 211a and 211b, while splitter 204b passes light to interference device 205c via light path 211c. Additionally, splitter 204b may pass light to a power monitor 208 on light path 211d.

The interference devices 205a, 205, 205c may be configured to generate output signals each having a sinusoidal wavelength relationship. These wavelength relationships may be desired to have different phases such that the peaks and troughs of one wavelength relationship do not align with the others. This results in at least one of the signals having a working zone at each wavelength over the wavelength range. Accordingly, the entire wavelength range may be a working zone where measurable information is available for the discrepancy between the actual wavelength or range of wavelengths and a target wavelength or a target range of wavelengths.

The light source(s) 213 may be a single light source or may comprise a plurality of separate light sources (the outputs of which may be multiplexed or otherwise combined into light path 203, which may then be received by the splitter 202). The light source(s) 213 may comprise any combination of coherent or semi-coherent light sources. Each light source 213 may emit a single wavelength of light (although it may be possible to generate small shifts in these light sources on the order of a few nanometers) or configured as a tunable light source that emits a range of wavelengths of light. Additionally, any number of light sources may be employed in the wavelength locking system 200, even though a single light source 213 is shown.

As discussed, the splitter 202 passes the split light to splitters 204a and 204b, which again split and pass light to the interference devices 205a, 205b, and 205c. The interference device 205a may receive the light which may be fundamental mode TE00 light. For example, the interference device 205a may receive light on light path 211a and may output light on light path 215a. As the light propagates through different waveguides of the interference device 205a, the light may convert from single mode light to two-mode light (i.e., having two different modes) and back to single mode light. Similarly, the interference devices 205b and 205c may receive light on light paths 211b, 211c and may output light on light paths 215b, 215c, respectively. These outputs on light paths 215a-215c may be connected to a controller (such as controller 109a discussed previously), which may use the intensities of these output signals to perform the wavelength locking operations discussed previously.

Figure 2B:
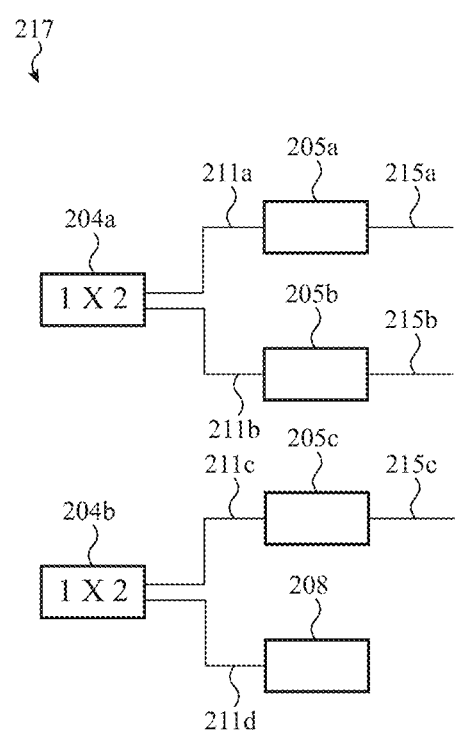
FIG. 2B illustrates a block diagram of splitters and multiple interference devices of the wavelength locking system of FIG. 2A.

FIG. 2B illustrates a block diagram of splitters and multiple interference devices 205a, 205b, 205c of the wavelength locking device 217 of FIG. 2A, and the interference devices 205a, 205b, 205c will be described in further detail herein. The interference devices 205a, 205b, 205c may be multi-mode waveguides that carry multiple modes of light therein (e.g., such as two-mode waveguides, three-mode waveguides, or any other number of modes, such as n-mode waveguides). In FIG. 2B, each of the interference devices 205a, 205b, and 205c include components such as an input waveguide, an interference waveguide, and an output waveguide. The components of the interference devices 205a, 205b, and 205c are described in further detail herein with respect to FIGS. 4A-8. Although two-mode waveguides are discussed with reference to the embodiment of FIGS. 2A and 2B, other interference waveguides (e.g., n-mode waveguides) may be used with this embodiment or any other. For example, three-mode waveguides may be used in the wavelength locking system 200; such waveguides are discussed with reference to FIGS. 6-8. Other interference waveguides such as four-mode waveguides, five-mode waveguides, and so forth may also be used in wavelength locking systems.

In some embodiments, the light may pass from the input waveguide to a bimodal (i.e., two-mode) waveguide, which supports two modes of light such as TE00 and TE01. The two modes may optically beat and thereby generate an interference-based output signal similar to that from a Mach-Zehnder Interferometer (MZI). The two modes may be collapsed to a single mode of light at the output. By using a two-mode waveguide, the device size may be smaller and may be relatively insensitive to temperature when compared to a wavelength locking system that may include other interference devices (e.g., employing one or more MZIs).

The wavelength relationship of the output signal produced by the interference device 205a may have a dead zone that does not align with dead zones in the wavelength relationships of other output signals (e.g., from the other interference devices 205b and 205c) and so together the interference devices may reliably generate output signals with information on the discrepancy between the measured wavelength and target wavelength, regardless of the where the measured wavelength falls within the working range of the wavelength locking system. That is, interference devices 205 may generate output signals that together may be used to reliably wavelength lock any wavelength over the wavelength range of interest. The free spectral range of the output signals may depend at least partially on the length of the interference waveguides, the wavelengths, and the modes of light propagating in the interference waveguides. The interference waveguides may be designed such that the output signals have peaks and troughs that do not align, thus allowing the output signal to be used for wavelength locking. The interference devices 205b and 205c perform the same functions and have the same or similar configurations as interference device 205a.

In some variations, the wavelength locking system 200 also optionally includes a power monitor 208. The power monitor 208 may receive the light from the light path 211d from the splitter 204b (though wavelength locking system 200 may not include splitter 204b in variations that do not include the power monitor 208) and may compare the measured power of light propagating along the output light path with a target power. The power monitor 208, which may be an optical detector, can be configured to measure the power or signal intensity of the light received from light path 211d, which may vary with (or otherwise correspond to) the light inputted to each of the interference devices 205a, 205b, and 205c, insofar as the light propagating along light path 211d is outputted from the splitter 204b, as are the inputs to each of the interference waveguides. In some embodiments, the power monitor 208 may pass a signal 219 corresponding to the received light to a controller 230 and the controller 230 may provide a feedback electrical signal on path 221 to a current source (not illustrated in FIG. 2A) that may be adjusted to tune the output light of the light source(s) 213. Additionally, the controller 230 may provide a signal to the current source(s) which may adjust the optical power of light provided by the light source(s) 213.

Additionally or alternatively, the power measured by the power monitor may be used to assist with the wavelength locking operations described here. While the interference devices described herein (such as interference devices 205a-205c) produce an output signal (or signals) that have a constant intensity for a given wavelength, this intensity may be dependent on the intensity of the light introduced to the interference device. Accordingly, the power measured by the power monitor 208 may be used to calculate the power received by a given interference device. By knowing the power of the input light for a given interference device, the wavelength locking system may be able to differentiate whether a change in intensity of a given output signal is a result in a change of wavelength or a change in the power of the input light.

Figure 3:
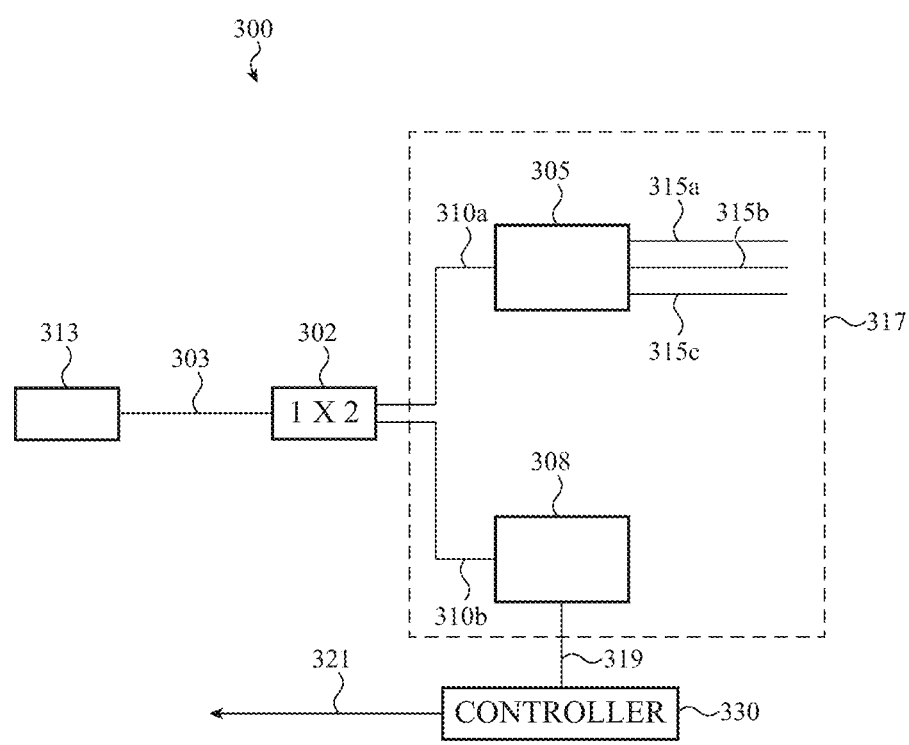
FIG. 3 illustrates a block diagram of an example wavelength locking system including an interference device.

FIG. 3 illustrates a block diagram of an example wavelength locking system including an interference device that produces multiple output signals. The wavelength locking system 300 includes a splitter 302, an interference device 305, a power monitor 308, and a controller 330, where the interference device 305 and power monitor 308 may be part of the wavelength locking device 317. Although the wavelength locking system 300 includes the splitter 302 and the power monitor 308, these are optional components in some embodiments. The components of the wavelength locking system 300 may perform similar functions as and may be similarly configured as, the components of the wavelength locking system 200, with the exception of the interference device 305. The interference device 305 may receive the single light input from the splitter 302 and the modes may interfere with one another to produce multiple output signals that may be output on first, second, and third light paths 315a, 315b, 315c. In some embodiments, the interference device 305 may include a three-mode waveguide which will be described in further detail with reference to FIGS. 6 and 8. Although three-mode waveguides are discussed with reference to the embodiment of FIG. 3, other interference waveguides (e.g., n-mode waveguides) may be used with this embodiment or any other. The wavelength locking device 317 may also include the interference device 305. The wavelength locking device 317 may function similarly to the interference device(s) 105 as described in FIG. 1. Additionally, it may be understood that even though the outputs 315a, 315b, 315c terminate inside of the wavelength locking device 317, that the outputs 315a, 315b, 315c may serve as outputs from the wavelength locking device 317.

In FIG. 3, light source(s) 313 emits light that propagates on light path 303 and is received by the splitter 302. The splitter 302 may split the light and output the split portions of light along light paths 310a and 310b. One light path 310a passes a first split portion of light from the splitter 302 to the interference device 305, while the other light path 310b passes a second split portion of light from the splitter 302 to the power monitor 308. The split portions of light received by the interference device 305 may be single mode light (e.g., the fundamental mode TE00). The single mode of light may be converted to two superimposed modes (e.g., TE00, TE01) using the interference device 305, and in some instances three superimposed modes of light such as TE00, TE01, and TE02, which may be combined light modes. These superimposed modes may expand and interfere with one another within a portion of the interference device 305, such that the light that reaches the different outputs of the interference device 305 may have intensities with wavelength relationships that vary in phase.

That is, the first light path 315a may output light having an intensity that has a sinusoidal wavelength relationship with a first phase, the second light path 315b may output light that has a sinusoidal wavelength relationship with a second phase, and the third light path 315c may output light that has a sinusoidal wavelength relationship with a third phase, where all of the phases are offset from one another. Similar to FIG. 2, the power monitor 308 of FIG. 3 may pass light on light path 319 to the controller 330. The power monitor 308 and controller 330 perform the same functions as the power monitor 208 and controller 230 described with reference to FIG. 2. For example, the controller 330 may adjust an output of the light source(s) 313 by transmitting an electrical signal on path 321 to the current source(s).

The interference device 305 generally outputs three signals with different interference between the different modes of light. The three modes of light may propagate in a portion of the interference device 305 (e.g., an interference waveguide) with different group velocities, resulting in different interferences between the modes TE00 and TE01, TE00 and TE02, and TE01 and TE02. Similar to the interference device 205 of FIG. 2, the interference device 305 is effective in producing output signals that may be used for wavelength locking the light source(s) as the multiple output signals produced by the interference device 305 may have wavelength relationships with dead zones that do not align with one another. The interference device 305a may reliably generate output light with information on the discrepancy between the measured wavelength(s) and target wavelength (s). That is, the interference device 305 may reliably wavelength lock any wavelength over the wavelength range of interest. In some embodiments, the wavelength range of interest may at least partially depend on the waveguide material and interference device design. The configuration and function of the interference device 305 is discussed in further detail herein with reference to the embodiment of FIG. 6.

Figure 4A:
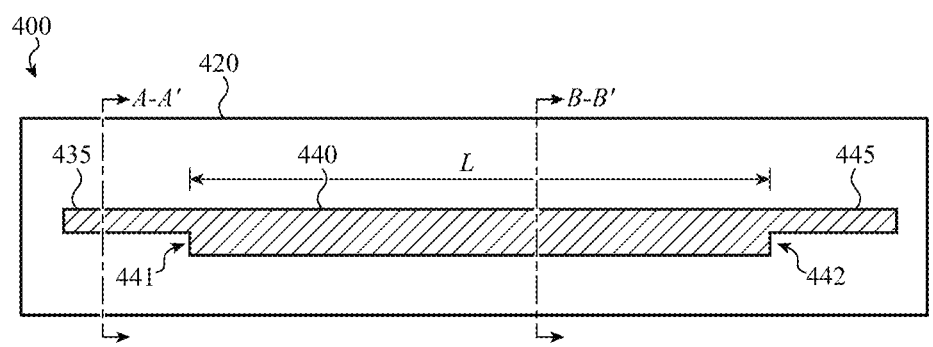
FIG. 4A illustrates a cross-sectional top view of an example interference device.

FIG. 4A illustrates an example interference device 400 that may be used with the systems described above with respect to FIGS. 2A and 2B. For example, any or all of the interference devices 205a, 205b, 205c of the wavelength locking system may be configured as the interference device 400. As shown there, the interference device 400 may include a first waveguide that is an input waveguide 435, a second waveguide that is an interference waveguide 440, and a third waveguide that is an output waveguide 445. As illustrated in FIG. 4A the interference waveguide 440 may be connected to the input waveguide 435 and the output waveguide 445. Although one output waveguide 445 is depicted in FIG. 4A, the interference device 400 may include multiple output waveguides 445. Cladding 420 may surround the input waveguide 435, the interference waveguide 440, and the output waveguide 445 to reduce light loss and to confine light to the propagation regions, thus defining the waveguides. The input waveguide 435 may be optically coupled to the interference waveguide 440 at a first end 441, and the output waveguide 445 may be optically coupled to the interference waveguide 440 at a second end 442. The positioning of the input and output waveguides 435, 445 relative to the interference waveguide 440 and to each other may affect the power of each mode of light that is carried by the interference waveguide 440 and how much light is coupled back into the single mode of light in the output waveguide 445. The interference device 400 may be designed so that each mode of the multiple modes of light may have the same power as one another, though in other instances the interference device 400 is configured so that different modes of the multiple modes of light have different powers.

The input waveguide 435 may receive light with a single mode and pass the single mode light to the interference waveguide 440. The interface between the input waveguide 435 and the interference waveguide 440 may convert a portion of the single mode light to a higher order mode of light. The mode conversion depends at least in part on the configuration (e.g., the relative size, positioning, and orientation) of the input waveguide 435 and the interference waveguide 440. For example, the input waveguide 435 may be narrow and confine the light to single mode light, while the interference waveguide 440 may be wider, thus allowing higher order modes of light to propagate in addition to the single mode light.

The interference waveguide 440 may then pass both the single mode and higher order mode of light to the output waveguide 445. The interface between the interference waveguide 440 and the output waveguide 445 may convert the higher order mode of light back to the single mode of light. Accordingly, the output waveguide 445 may receive the single and higher order mode of light and output a second single mode of light. Similar to the input waveguide 435, the output waveguide 445 may be narrow and support light with a single mode. The output may be used to wavelength lock a measured wavelength of light to a target wavelength as described herein.

Specifically, the different modes of light will interfere along the length of the interference waveguide 440. The amount of interference for a given wavelength of light varies spatially within the interference waveguide 440, and thus the intensity of light received by the output waveguide 445 has a constant intensity at a given wavelength. This intensity varies sinusoidally as the wavelength changes, as discussed previously. The relative size, positioning, and orientation of the input waveguide 435, the interference waveguide 440, and the output waveguide 445 will set the phase of this sinusoidal wavelength relationship. Accordingly, when a wavelength locking system (such as wavelength locking system 200 discussed previously) uses multiple interference devices, multiple versions of interference waveguides 440 may be designed to have wavelength relationships with different phases.

Each of the input waveguide 435, the interference waveguide 440, and the output waveguide 445 may have a first cladding, a propagation region, and a second cladding that are the structure of the waveguide: the upper cladding, the propagation region through which light passes, and the lower cladding, respectively. The single mode of light and the higher order mode of light propagate in the propagation region of the waveguides, which will be described in further detail with respect to FIG. 4B. The input waveguide 435 may support single mode light and is optically coupled to the first end 441 of the interference waveguide 440, such that light may pass from the input waveguide 435 to the interference waveguide 440 with little to no optical loss. The interference waveguide 440 supports both the single mode and higher order mode of light and receives the first single mode of light from the input waveguide 435. The interference waveguide 440 passes the single and higher order mode of light to the output waveguide 445 with little to no optical loss. The output waveguide 445 supports a second single mode of light and is optically coupled to the second end 442 of the interference waveguide 440 to receive the single and higher order mode of light from the interference waveguide 440. The output light of the output waveguide 445 may be used to wavelength lock a measured wavelength of light to a target wavelength.

In some embodiments the widths of the input waveguide 435, the interference waveguide 440, and the output waveguide 445 determine, at least in part, the modes of light that may propagate through each of them. As shown in FIG. 4A, the input waveguide 435 may have a first width, the interference waveguide 440 may have a second width, and the output waveguide 445 may have a third width, where each of the first, second, and third widths are constant. In other variations, one or more of the input waveguide 435, the interference waveguide 440, and the output waveguide 445 may be tapered. Generally, the first width of the input waveguide 435 may be different than the second width of the interference waveguide 440. As shown in FIG. 4A, the first width is narrower than the second width, though in some embodiments, the first width may be the same size as the second width. The third width (e.g., the output waveguide 445) also may be different than the second width (e.g., the interference waveguide 440) and, also as shown in FIG. 4A, the third width (e.g., the output waveguide 445) may be narrower than the second width (e.g., the interference waveguide 440). Additionally, in some embodiments, the first and third widths may be the same, although they may be different from one another in other embodiments. The widths of the input waveguide 435, the interference waveguide 440, and the output waveguide 445 may be selected to decrease the optical loss of the interference device 400. For example, the optical loss may be decreased by reducing the width of the input and output waveguides 435, 445, as compared to the interference waveguide 440 and also by offsetting the center axes of the input and output waveguides 435, 445 with respect to the center axis of the interference waveguide 440. That is, the center axes of the input and output waveguides 435, 445 are offset from a center axis of the interference waveguide 440.

A center axis of the input waveguide 435 may be in an offset position from a center axis of the interference waveguide 440 and/or a center axis of the output waveguide 445 may be in an offset position from the center axis of the interference waveguide 440. The input waveguide 435 and output waveguide 445 may be positioned relative to the interference waveguide 440 to increase sensitivity to a selected mode of light. In FIG. 4A, by offsetting both the center axis of the input waveguide 435 and the output waveguide 445 from the center axis of the interference waveguide 440, the interference waveguide may support the TE01 mode, which is a first higher mode of light. By controlling the center axes displacement of the input waveguide 435 and the output waveguide 445, the optical power may be split between superimposed modes in the interference waveguide 440. Although the input waveguide 435 and the output waveguide 445 are illustrated in FIG. 4A as offset from the interference waveguide 440 in one direction, this is but one example of a configuration of the interference device 400. Other configurations of the input waveguide 435, the interference waveguide 440, and the output waveguide 445 are possible and several will be described with reference to FIGS. 5A-5C.

The input waveguide 435, the interference waveguide 440, and the output waveguide 445 may be strip waveguides, although in some instances the input waveguide 435 and/or the output waveguide 445 may be rib waveguides and may be used with a strip-to-rib or rib-to-strip waveguide conversion. Although either strip waveguides or rib waveguides may be used, strip waveguides have a larger index of refraction change between modes of light, whereas rib waveguides have a smaller index of refraction change between modes of light, and thus in some applications strip waveguides may be used exclusively. Higher order modes may attenuate more quickly in a rib waveguide than in a strip waveguide. Additionally, when using a rib waveguide, the smaller index of refraction change between the layers of the rib waveguide may not generate higher order modes as quickly as the higher refractive index change between the layers of strip waveguides due to the reflective properties associated with the higher refractive index, thus the input waveguide 435, the interference waveguide 440, and the output waveguide 445 may all be rib waveguides.

Figure 4B:
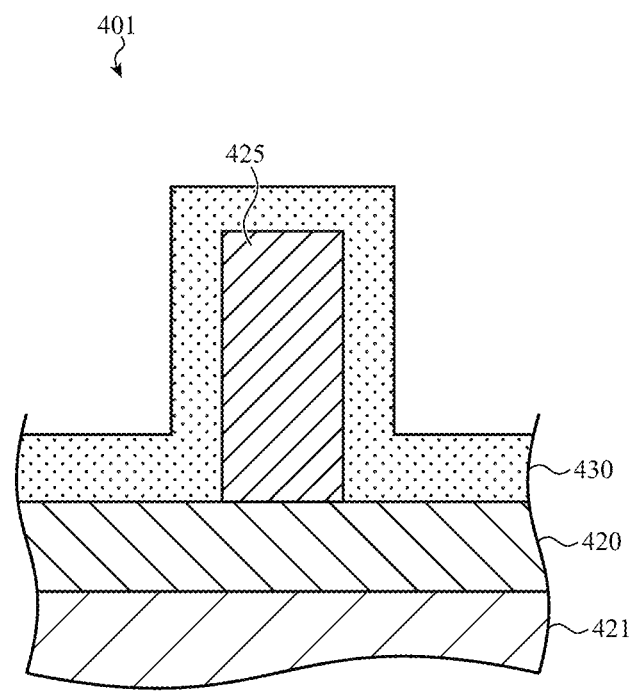
FIG. 4B illustrates a cross-sectional side view of one example of an input waveguide of the interference device of FIG. 4A.

FIG. 4B illustrates a cross-section of one example of a waveguide taken along line A-A' of FIG. 4A. The waveguide 401 illustrates a generic structure through which light may propagate and is not drawn to scale. The waveguide 401 includes a silicon substrate 421, a first cladding layer 420, a propagation layer 425, and a second cladding layer 430. As shown in FIG. 4B, the first cladding layer 420 is disposed on the silicon substrate 421, the propagation layer 425 (which may be a propagation region) is disposed on the first cladding layer 420, and the second cladding layer 430 is disposed on the propagation layer 425. Although FIG. 4B depicts the first cladding layer 420 and the second cladding layer 430, there may be cladding layers surrounding the sides of the waveguide as well as having cladding layers above and below the cladding layers. In this embodiment, light emitted by a light source propagates into or out of the plane of the figure and specifically through the propagation region of the waveguide, which is the propagation layer 425. In some embodiments, the first cladding layer 420 and the second cladding layer 430 may be formed from an oxide, such as silicon dioxide or other appropriate dielectric materials.

Figure 4C:
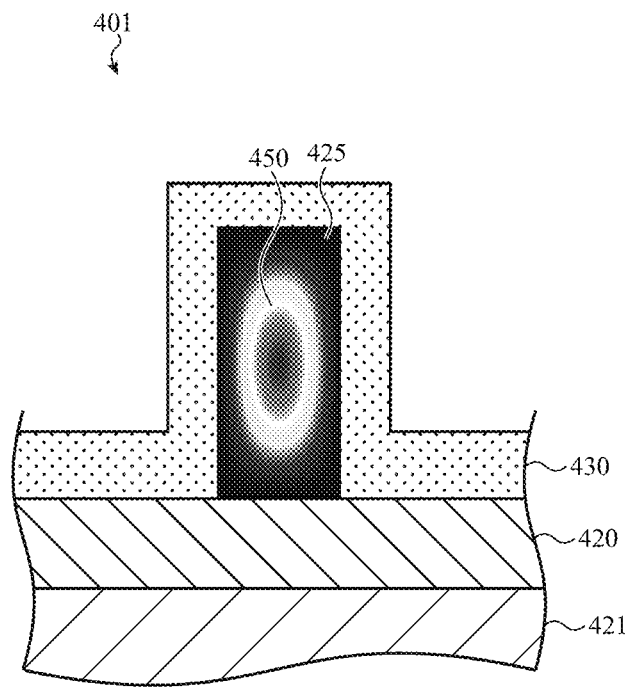
FIG. 4C illustrates a cross-sectional side view of a single mode of light in the input waveguide of the interference device of FIG. 4A.

FIG. 4C illustrates a cross-section of one example of a waveguide taken along line A-A' of FIG. 4A and illustrates a cross-section of the waveguide 401 shown in which light with a single mode 450 propagating therethrough. As previously discussed in FIG. 4A, the input waveguide 435, the interference waveguide 440, and the output waveguide 445 all may support a single mode of light 450, such as a fundamental mode of light (e.g., TE00). The light having the fundamental mode may propagate through the input waveguide 435 and to the interference waveguide 440. Although the single mode of light 450 is described above as propagating through the interference waveguide 440, the interference waveguide 440 may support more than the fundamental mode of light. Additionally, the supported modes of light in the interference waveguide 440 may be collapsed into a single mode of light 450 in the output waveguide 445, which may output the fundamental mode of light 450 shown in FIG. 4C.

Figure 4D:
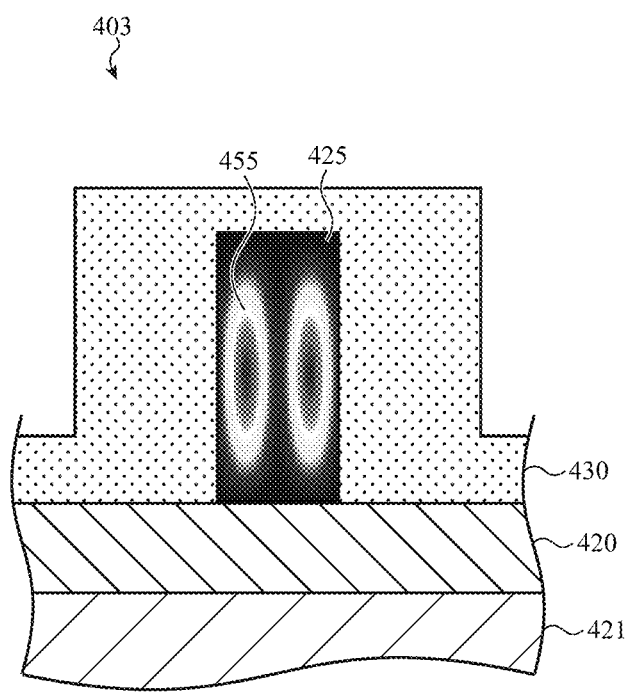
FIG. 4D illustrates a cross-sectional side view of a higher order mode of light in the interference waveguide of the interference device of FIG. 4A.

FIG. 4D illustrates a cross-section of one example of a waveguide taken along line B-B' of FIG. 4A and illustrates a cross-section of a higher order mode of light in the interference waveguide of the interference device in FIG. 4A. The waveguide cross-section 403 includes similar elements as the waveguide cross-section 401 of FIG. 4C, except FIG. 4D shows the aforementioned higher order mode of light 455. The interference waveguide 440 may receive the single mode of light 450 from the input waveguide 435 and convert part of the single mode of light 450 to a higher order mode of light 455. For example, the interference waveguide 440 converts part of the single mode of light 450 to the TE01 mode of light 455. Although FIG. 4D only illustrates the higher order mode of light 455, the interference waveguide 440 also allows the single mode of light 450 of FIG. 4C as well as the higher order mode of light 455 of FIG. 4D to propagate along its length L at different group velocities and phase velocities (thereby resulting in interference between the modes as discussed previously). Further, the interference waveguide 440 of FIG. 4A supports combined light having two modes (e.g., TE00 and TE01) that may propagate through interference waveguide 440.

Figure 5A:
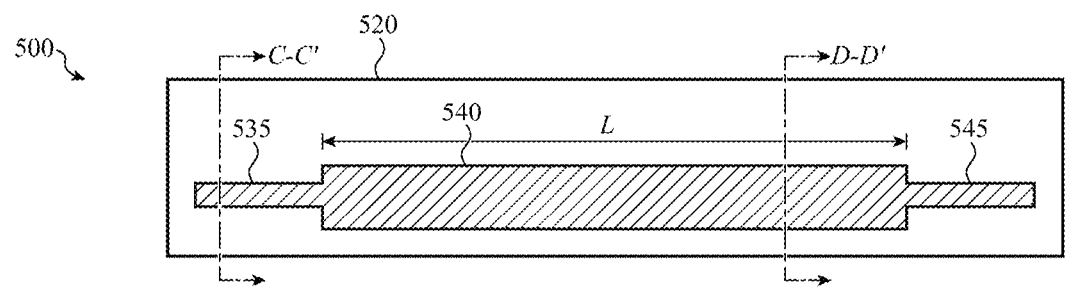
FIG. 5A illustrates a cross-sectional top view of an example interference device.

FIG. 5A illustrates another example interference device 500 that may be used with the systems described above with respect to FIGS. 2A and 2B (e.g., in place of some or all of the interference devices 205a-205c of the wavelength locking system 200). The interference device 500 includes similar components as the device of FIG. 4A and illustrates another configuration of the components that support a different higher order light mode. The interference device 500 includes input waveguide 535, interference waveguide 540, and output waveguide 545. The input waveguide 535 and the output waveguide 545 may be physically similar to the input and output waveguides 435 and 445 of FIG. 4A and also functionally similar in that the input and output waveguides 535 and 545 support a single mode of light and each includes a first and second cladding layer and a propagation layer. Similar to FIG. 4A, cladding 520 may surround the input waveguide 535, the interference waveguide 540, and the output waveguide 545 to decrease optical loss.

In FIG. 5A, the input waveguide 535 and output waveguide 545 may be symmetrically positioned so that the center axes of these waveguides align with a center axis of the interference waveguide 540. The symmetric positioning of the input and output waveguides 535, 545 enables the generation of a first even higher mode of light TE02 in the interference waveguide 540 and ensures that the TE01 mode is not excited in the interference waveguide 540. Accordingly, the interference waveguide 540 is a bimodal waveguide that supports the single mode of light and a higher mode of light, such as the first even higher mode TE02. The single mode and higher mode of light are superimposed on one another and propagate through the interference waveguide 540.

Additionally, the interference waveguide 540 may be wider than the equivalent waveguide shown in FIG. 4A, so that it may support the higher order mode TE02. Generally, different widths of interference waveguides may be used so long as they support the appropriate modes used in the interference device. Further, the size (e.g., width, length, and/or other dimensions) of the input, interference, and output waveguides may affect a number of different aspects of the waveguide device such as optical power, supported modes of light, coupling efficiency between waveguides, interference between modes, any combination thereof, and so forth.

Similar to FIG. 4A, the input waveguide 535 may receive a single mode of light (e.g., TE00) that propagates through the propagation layer and passes to the interference waveguide 540. The interference waveguide 540 may generate a superposition of two modes TE00 and TE02 that propagate therethrough. As previously described, the interference waveguide 540 may support modes that have different refractive indices, and the higher modal dispersion may allow for a more compact device than an MZI. The refractive index (e.g., modal index) is dependent on various factors including the wavelength and the mode of light. The interference waveguide 540 passes both the single and even higher order mode to the output waveguide 545, which collapses the modes back into a single mode of light. The output waveguide 545 may output an output signal with a sinusoidal wavelength relationship similar to that from a single MZI The phase of the sinusoidal wavelength relationship may be set by the relative size, positioning, and orientation of the input waveguide 535, the interference waveguide 540, and the output waveguide 545, such as described previously. The output signal may allow the measurement of information on the discrepancy between the actual wavelength or range of wavelengths and target wavelength or target range of wavelengths as discuss previously.

Figure 5B:
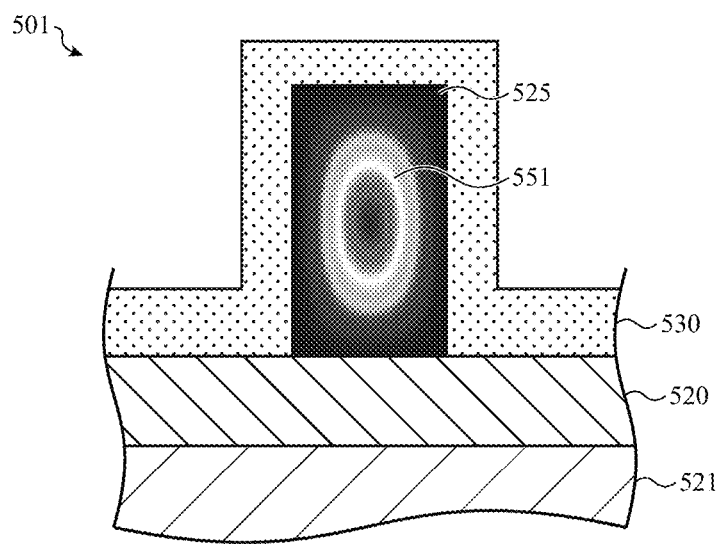
FIG. 5B illustrates a cross-sectional side view of a single mode of light in the input waveguide of the interference device of FIG. 5A.
Figure 5C:
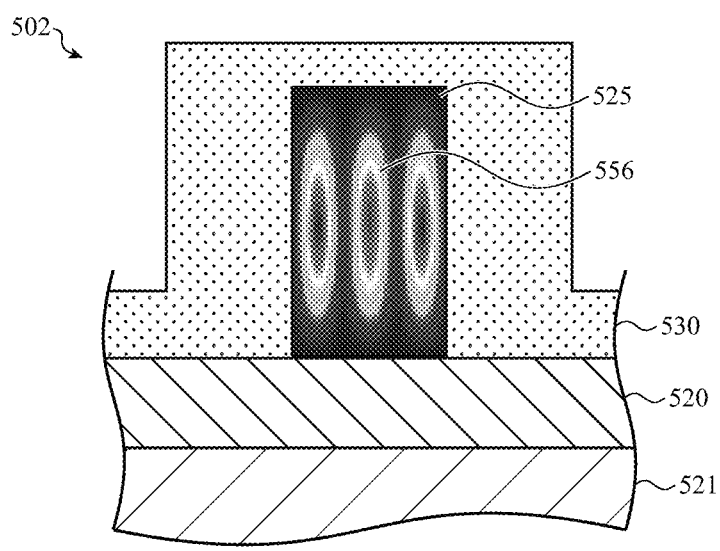
FIG. 5C illustrates a cross-sectional side view of a higher order mode of light in the interference waveguide of the interference device of FIG. 5A.

FIG. 5B illustrates a cross-section of one example of a waveguide taken along line C-C' of FIG. 5A and illustrates a cross-section of one example of a waveguide taken along line B-B' of FIG. 4A and FIG. 5C illustrates a cross-section of one example of a waveguide taken along line D-D' of FIG. 5A and is similar to the cross-section as FIG. 5B, except for the inclusion of the higher order mode of light instead of the fundamental mode of light. The waveguide 501 of FIG. 5B and the waveguide 502 of FIG. 5C are similar to the waveguides of FIGS. 4C and 4D, respectively. Both of the waveguides 501 and 502 include a first cladding layer 520, a propagation layer 525, and a second cladding layer 530. The waveguide 501 of FIG. 5B shows a single mode of light 551, TE00, propagating therealong, while the waveguide 502 of FIG. 5C includes the higher order mode of light 556, TE02, propagating within it.

Figure 6:
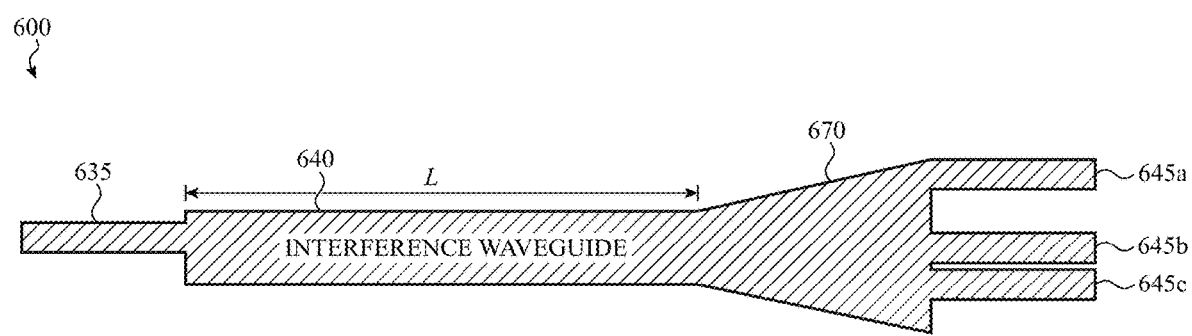
FIG. 6 illustrates a top view of another example interference device.

FIG. 6 illustrates another example interference device showing the use of additional modes of light that generate additional interference signals, specifically one that may produce a plurality of output signals. The interference device 600 may include an input waveguide 635, an interference waveguide 640, a mode expansion section 670, and a first output waveguide 645a, a second output waveguide 645b, and a third output waveguide 645c. The input waveguide 635 and output waveguides 645a-645c perform similar functions to the input and output waveguides described with reference to FIGS. 4A and 5A in that they support single modes of light. The mode expansion section 670 functions to expand interfering modes, as described herein. While shown in FIG. 6 as having three output waveguides 645a-645c, it should be appreciated that the interference device 600 may be configured to produce only two outputs, and may be paired with an additional interference device (such as one of those discussed above with respect to FIGS. 4A and 5A) to collectively three output signals.

Similar to FIGS. 4A and 5A, the input waveguide 635 of FIG. 6 may receive single mode light (e.g., TE00) as input light and pass the input light to the interference waveguide 640. The interference waveguide 640 may receive the single mode input light and generate a superposition of three modes of light (e.g., TE00, TE01, and TE02 modes). The three modes of light may propagate along length L of the interference waveguide 640 with different group velocities and (instances where the interference device 600 includes a mode expansion section 670) pass to the mode expansion section 670. The mode expansion section 670 allows the three modes of light to expand via adiabatic expansion or free diffraction, similar to the diffraction in a slab waveguide. The mode expansion section 670 effectively expands the width of the interference waveguide 640, which gives additional space to place the output waveguides 645a-645c. In some embodiments, the mode expansion section 670 may be optional and the three modes may pass directly to the output waveguides 645a, 645b, and 645c from the interference waveguide 640.

Depending on the relative placement and dimensions of the input waveguide 635, the interference waveguide 640, and the output waveguides 645a-645c, each of the output waveguides 645a-645c will produce an output signal based on the interference between some or all of the modes. The output signal of each of the output waveguides 645a-645c will have a wavelength relationship such that the intensity of the output signal of a given output waveguide (e.g., the first output waveguide 645a) varies as a function of the wavelength of the input light. Depending on which modes are present at the start of a given output waveguide, this wavelength relationship may or may not be sinusoidal. For example, in some instances the wavelength relationship may be the superposition of multiple sinusoids having different frequencies. It may be desirable to position the first, second, and third output waveguides 645a-645c to have different relative contributions of the different modes, so that each of these output waveguides has a different wavelength relationship. This may thereby facilitate using the interference device 600 for wavelength locking by reducing the alignment of dead zones between the output signals of the first, second, and third output waveguides 645a-645c.

In some instances, it may be desirable to center one or more of the output waveguides 645a-645c at a null for one of the modes of light. When an output waveguide is center at a null for a given mode, the output signal is based only on the interference between the remaining two modes. For example, an output waveguide centered at a null of the TE02 mode will generate an output signal based on interference between the TE00 and TE01 modes. An output waveguide centered at a null of the TE01 mode will generate an output signal based on interference between the TE00 and TE02 modes, and an output waveguide centered at a null of the TE00 mode will generate an output signal based on interference between the TE01 and TE02 modes. The output signal of an output waveguide centered on a null of a mode will have an intensity with a sinusoidal wavelength relationship.

In some variations, the output waveguides 645a-645c are centered at different nulls, such that each output waveguide generates an output signal based on the interference of a different pair of modes. For example, one output waveguide will generate an output signal based on the interference between the TE00 and TE01 modes, a second output waveguide will generate an output signal based on the interference between the TE01 and TE02 modes, and a third output waveguide will generate an output signal based on the interference between the TE00 and TE02 modes.

In the variation shown in FIG. 6, the second waveguide 645b is centered at a null of a first mode (e.g., the TE00 mode). In some instances, the second waveguide 645b is also positioned at a center of the mode expansion section 670. It may be desirable for the first output waveguide 645a, the second output waveguide 645b, and the third output waveguide 645c to be asymmetrically positioned relative to the mode expansion section 670. Accordingly, in instances where the second output waveguide 645b is centered on a center axis of the mode expansion section 670, the first output waveguide 645a and the third output waveguide 645c may be positioned asymmetrically relative to the mode expansion section 670.

In these instances, the first output waveguide 645a is positioned a first distance from the second output waveguide 645b, and the third output waveguide 645c is positioned a second distance (different than the first distance) from the second output waveguide 645b. This asymmetric positioning gives the first and third output waveguides 645a, 645c to experience different relative contributions (i.e., different "views") of the three modes. In some of these variations, the first output waveguide 645a or the third output waveguide 645c may be centered at a null of a second mode (e.g., a TE02 mode). In other instances (as described below with respect to FIG. 7), it may be desirable to have two waveguides symmetrically positioned with respect to the mode expansion section 670.

The input waveguide 635 may have any suitable orientation relative to the interference waveguide 640 that facilitates the generation of the two additional modes so that the interference waveguide 640 carries light with three modes as discussed above. In the variation shown in FIG. 6, the position of the center axis of the input waveguide 635 may be offset from the center axis of the interference waveguide. The asymmetric displacement at launch may generate the additional mode and, depending on its placement, allow for generation of similar power for all three modes in the interference waveguide 640. In some embodiments, the input waveguide 635 may be tilted to achieve a similar or same result.

In some instances, the interference devices may be configured to produce a plurality of outputs that may be used to measure a power level of light received by the interference device. In these instances, the interference device may be used as a power monitor, as described previously. These output signals may also be used to perform wavelength locking as described above, which may allow a single component to provide all of the signals needed to perform both power monitoring and wavelength locking operations.

Figure 7:
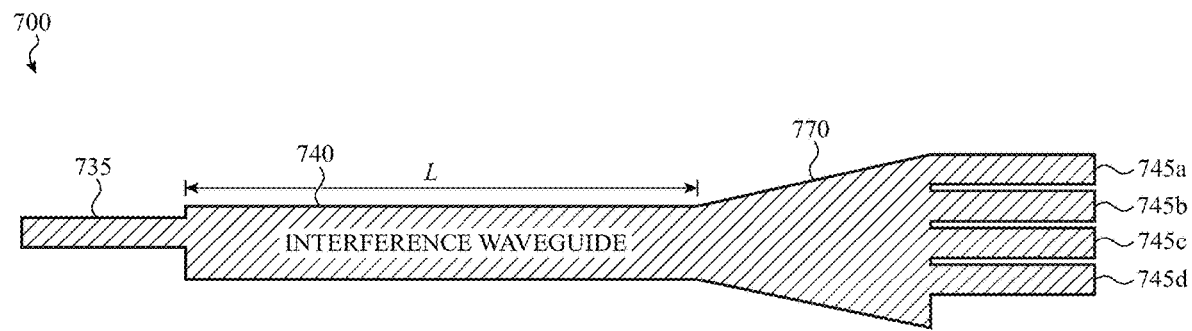
FIG. 7 illustrates a top view of another example interference device.

FIG. 7 illustrates another example interference device 700 that provides a set of output signals that can be used both to measure a power level of light and to lock a wavelength of the light. The interference device 700 includes an input waveguide 735, an interference waveguide 740 of length L, an optional mode expansion section 770, and four output waveguides (including a first output waveguide 745a, a second output waveguide 745b, a third output waveguide 745c, and a fourth output waveguide 745d). The interference device 700 functions similarly to the interference device 600 described with reference to FIG. 6, except for the number and placement of the output waveguides.

Specifically, two of the output waveguides (e.g., the second output waveguide 745b and the fourth output waveguide 745d) are centered at nulls of a first mode (e.g., the TE02 mode). The output signals generated by the second and fourth output waveguides 745b, 745d each have an intensity with a sinusoidal wavelength relationship. For example, when the second and fourth output waveguides 745b, 745d are each positioned at a corresponding null of the TE02, each will produce an output signal with a sinusoidal wavelength relationship that varies based on interference between the TE00 and TE01 modes. The second and fourth output waveguides 745b, 745d may be positioned such that these wavelength relationships are 180 degrees out of phase. As a result, the sum of the output signals will be independent of the wavelength of the input light, but will be proportional to power of the input light received by the input waveguide 735. Accordingly, the output signals of the second and fourth waveguides 745b, 745d may be used to calculate the power of input light received by the interference device 700.

Additionally, the first and third output waveguides 745a, 745c may be positioned to generate output signals with different wavelength relationships. For example, one of the output waveguides, the third output waveguide 745c, may be centered at a null of a second mode. In the variation shown in FIG. 7, the third output waveguide 745c is centered at a null of a TE00 mode, and generates an output signal with a sinusoidal wavelength relationship based on interference between the TE01 and TE02 modes. As shown there, the third output waveguide 745c is centered on the mode expansion section 770 (e.g., a center axis of the third output waveguide 745c is positioned on a center axis of the mode expansion section 770). In these variations, the second and fourth output waveguides 745b, 745d may be symmetrically positioned with respect to the mode expansion section 770, such that the second output waveguide 745b is separated from the third output waveguide 745c by a first distance and the fourth output waveguide 74d b is separated from the third output waveguide 745c by the same first distance.

Additionally, one of the waveguides may be positioned such that its output signal is based on interference between all three modes (e.g., interference between the TE00 and TE01 modes, interference between the TE01 and TE02 modes, and interference between the TE00 and TE02 modes). For example, in the variation shown in FIG. 7, the first output waveguide 745a is positioned such that its output signal is based on interference between all three modes. In some of these variations the first output waveguide 745a is centered on a peak of the first mode. For example, in some variations in which the second and fourth output waveguide 745b, 745d are centered at respective nulls of the TE02 mode, the first output waveguide 745a may be centered at a peak of the TE02.

Accordingly the output signals generated by the second and fourth output waveguides 745b, 745d may be used to measure power of the input light, and one or both of these output signals may be used with the output signals of the first and third output waveguides 745a, 745c to perform a wavelength locking operation as discussed herein.

Figure 8:
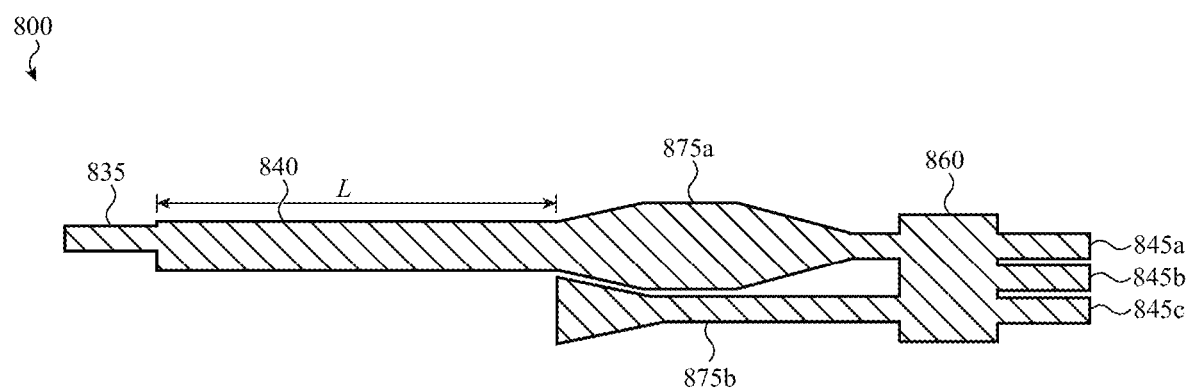
FIG. 8 illustrates a top view of an example of a hybrid interference device.

FIG. 8 illustrates an example of a hybrid interference device. FIG. 8 illustrates an alternative way to achieve dead zones of the output signals that do not align with one another, by interfering the light modes using an interferometer, separating the modes into the TE00 and TE01 modes, and then generating the output signals, each having a wavelength relationship with a unique phase shift. The hybrid interference device 800 includes an input waveguide 835, an interference waveguide 840 of length L, a mode separator 875, a splitter 860, and output waveguides 845a, 845b, 845c.

Similar to some of the interference devices described previously, the input waveguide 835 may receive input light having a single mode. As the input waveguide 835 transitions to the interference waveguide 840 (e.g., at an interface between the two waveguides), some of the input light is converted to a higher order mode of light, such that the interference waveguide 440 carries two modes of light. For example, if the input waveguide 835 receives input light having TE00 mode, the transition to the interference waveguide 840 may convert some of the input light to the TE01 modes, such that the interference waveguide 840 carries both TE00 and TE01 modes of light. In other instances, the input light generated in the interference waveguide 840 may be TE00 and TE02 light. The generation of the higher order mode of light may be based on the relative size, position, and orientation between the input waveguide 835 and the interference waveguide 840, such as discussed previously.

The interference waveguide 840 is optically coupled to a mode separator 875, and the mode separate 875 acts to separate the two modes of light carried by the interference waveguide 840 into separate waveguides. For example, in variations where the interference waveguide 840 carries TE00 and TE01 modes of light, a first waveguide may receive the TE00 mode while a second waveguide may receive the TE01 mode of light. The mode separator 875 has a first section 875a and a second section 875b. The first section 875a may be a first waveguide that is directly connected to the interference waveguide 840 (i.e., the first section 875a and the interference waveguide 840 represent different portions of a common waveguide), whereas the second section 875b is a second waveguide that is positioned sufficiently close to the first section 875a to allow optical coupling therebetween.

Specifically, each of the first section 875a and the second section 875b include corresponding tapers that are adiabatic and optically coupled to each other. The taper of the first section 875a is directly connected to the interference waveguide 840. The first section 875a initially receives both modes of light from the interference waveguide 840 (i.e., at the taper of the first section 875a). The tapers of the first section 875a and the second section 875b are configured such that, within the taper of the first section 875a, light of one of the modes may couple into the second section 875b of the mode separator 875 (i.e., into the taper of the second section 875b). For example, in some instances the higher order mode (e.g., TE01 or TE02) may couple into the second section 875b, while the original mode (e.g., TE00) remains in the first section 875a and continues to propagate through the first section 875a of the mode separator 875. In these instances, the second section 875b may be configured to confine the higher order mode of light and convert the higher order mode back to the original mode of the input light (e.g., convert TE01 or TE02 light to TE00 light). In this way, the first and second sections 875a, 875b may each output light having the same mode as the input light.

The first and section sections 875a, 875b may act as input waveguides for the splitter 860. Accordingly, the first section 875a passes a first amount of light to a first input of the splitter 860, while the second section 875b passes a second amount of light to a second input of the splitter 860. The relative amounts of light in the first and second sections 875a, 875b (i.e., the first and second amounts of light) are dependent on the interference between the two modes at the transition between the interference waveguide 840 and the mode separator 875. Because this interference has a wavelength dependency, the relative amounts of light in the first and second sections 875a, 875b (and thus the relative amounts of light received by the splitter 860) will vary as a function of wavelength of the input light.

The splitter 860 is a two by three splitter with two input waveguides and three output waveguides. The first and the second sections 875a, 875b act as the two input waveguides. In some instances, it may be desirable to taper the width of the first and second sections 875a, 875b to narrow widths of the inputs of the splitter 860. This may act to improve wavelength independence of the splitter 860 by reducing insertion losses, as a function of wavelength, as light enters the splitter 860. A first output waveguide 845a, a second output waveguide 845b, and a third output waveguide 845c act as output waveguides of the splitter 860.

The two by three splitter splits light received at each of its input waveguides between its three output waveguides. When light is simultaneously received at both of its input waveguides, the three output waveguides will each output a different combination of the input light. As the relative amount of light received by each input waveguide (e.g., the first amount and second amount described previously) changes, so will the relative intensity of light output at each of the three output waveguides. Since the relative amount of light received by each input waveguide varies as a function of wavelength, the intensity of the output signals provided by the first output waveguide 845a, second output waveguide 845b, and third output waveguide 845c will also vary as a function of wavelength. The positioning of the first output waveguide 845a, second output waveguide 845b, and third output waveguide 845c may be selected such the output waveguides 845a-845c have wavelength relationships with different phases relative to each other (e.g., a 120 degree phase between each wavelength relationship or the like). These output signals may be used for wavelength locking, such as described in more detail above.

The functions of the splitter 860 may be performed by any suitable two-by-three splitter. For example, the two-by-three multi-mode interference device (e.g., where the light at each input waveguide is converted from a single mode into multiple modes in an interference waveguide), a two-by-three star coupler (e.g., where the input waveguides and output waveguides are each connected to a free propagation region), or the like. For example, in a two-by-three star coupler, the splitter 860 comprises a free propagation region connecting the input waveguides to the output waveguides. The light received by the first section 875a and second section 875b of the mode separator 875 is input to a free propagation region. In the free propagation region, the light may diffract in the plane of the waveguide and may spread out in a Gaussian-like profile so that light from the two inputs may be received by all three of the output waveguides 845a, 845b, 845c.

The relative positioning between the input waveguides of the two-by-three star coupler and the output waveguides 845a-845c provide desired phase separations for light received by each of the output waveguides 845a-845c. For example, for a given wavelength, the first output waveguide 845a may receive light from the first input waveguide having a first phase separation (e.g., −60 degrees) from light it receives from the second input waveguide. Similarly, the second output waveguide 845b may receive light from the first input waveguide having a second phase separation (e.g., 0 degrees) from light it receives from the second input waveguide. The third output waveguide 845c may receive light from the first input waveguide having a third phase separation (e.g., +60 degrees) from light it receives from the second input waveguide. In some embodiments, the phase separation may be −60, zero, and +60 degrees phase separation for the first, second, and third output waveguides 845a, 845b, and 845c for a given wavelength, though it should be appreciated that these phase separations may vary with wavelength.

In some variations, such as shown in FIG. 8, the central axes of the first and third output waveguides 845a and 845 may be symmetrically offset relative to the center axis of the free propagation region, and a central axis of the second output waveguide 845b may centered relative to the central axis of the free propagation region.

Further, although process steps or method steps can be described in a sequential order, such processes and methods can be configured to work in any suitable order. In other words, any sequence or order of steps that can be described in the disclosure does not, in and of itself, indicate a requirement that the steps be performed in that order. Further, some steps may be performed simultaneously despite being described or implied as occurring non-simultaneously (e.g., because one step is described after the other step). Moreover, the illustration of a process by its description in a drawing does not imply that the illustrated process is exclusive of other variations and modification thereto, does not imply that the illustrated process or any of its steps are necessary to one or more of the examples, and does not imply that the illustrated process is preferred.

Representative applications of methods and apparatuses according to the present disclosure are described in this section. These examples are being provided solely to add context and aid in the understanding of the described examples. It will thus be apparent to one skilled in the art that the described examples may be practiced without some or all of the specific details. Other applications are possible, such that the following examples should not be taken as limiting.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A wavelength locking device, comprising:
an input waveguide configured to support a first single mode of light;
an interference waveguide with a first end optically coupled to the input waveguide and configured to:
receive the first single mode of light from the input waveguide; and
convert the first single mode of light into at least three different modes of light; and
a first output waveguide, a second output waveguide, and a third output waveguide, each optically coupled to a second end of the interference waveguide and configured to:
receive the at least three different modes of light from the interference waveguide;
support a second single mode of light; and
output the second single mode of light to wavelength lock a measured wavelength of light to a target wavelength.

2. The wavelength locking device of claim 1, wherein:
light propagating from the input waveguide to the interference waveguide is converted into a TE00 mode of light, a TE01 mode of light, and a TE02 mode of light; and
the TE00, TE01, and TE02 modes of light are superimposed within the interference waveguide.

3. The wavelength locking device of claim 1, wherein:
the input waveguide is positioned so that a center axis of a first end of the interference waveguide is offset from a center axis of the input waveguide.

4. The wavelength locking device of claim 1, comprising a fourth output waveguide optically coupled to the interference waveguide.

5. The wavelength locking device of claim 4, wherein the second output waveguide and the fourth output waveguide are each positioned at a corresponding null of a first mode of the at least three different modes of light.

6. The wavelength locking device of claim 1, wherein:
two output waveguides of the first output waveguide, the second output waveguide, and the third output waveguide are positioned asymmetrically relative to a center of the second end of the interference waveguide.

7. The wavelength locking device of claim 6, wherein:
the at least three different modes of light are a TE00 mode of light, a TE01 mode of light, and a TE02 mode of light;
the first output waveguide is placed at a null of the TE02 mode of light; and
the first output waveguide and the third output waveguide are positioned asymmetrically with respect to each other.

8. A wavelength locking device, comprising:
an input waveguide configured to:
receive light; and
support a first single mode of light;
an interference waveguide with a first end optically coupled to the input waveguide and configured to:
receive the first single mode of light from the input waveguide; and
support at least two different modes of light;
a mode separator optically coupled to a second end of the interference waveguide, comprising a first waveguide directly connected to the interference waveguide and a second waveguide optically coupled to the first waveguide, and configured to:
separate the at least two different modes of light;
output a first mode of light of the at least two different modes of light in the first waveguide; and
output a second mode of light of the at least two different modes of light in the second waveguide; and
a splitter configured to receive light from the first waveguide and the second waveguide, and to generate multiple output signals having wavelength relationships that are phase shifted relative to one another; wherein:
the multiple output signals are used to wavelength lock a measured wavelength of light to a target wavelength.

9. The wavelength locking system of claim 8, wherein:
the input waveguide is positioned so that a center axis of the input waveguide is offset relative to a center axis of the interference waveguide, thereby generating at least two modes of light in the interference waveguide and reducing insertion loss;
the interference waveguide receives the first mode of light and generates the second mode of light;
the interference waveguide outputs a combined first mode of light and the second mode of light; and
the splitter has two waveguide inputs and three waveguide outputs.

10. The wavelength locking system of claim 8, wherein:
the input waveguide is configured to receive a fundamental mode of light; and
the input waveguide is narrower than the interference waveguide.

11. The wavelength locking system of claim 8, wherein:
the splitter generates three output signals
wavelength relationships with unique phase shifts.

12. The wavelength locking system of claim 8, wherein:
the splitter comprises:
a free propagation region having an output end;
a first output waveguide positioned so that a center axis of the output end of the free propagation region is aligned with a center axis of the first output waveguide;
a second output waveguide positioned at the output end and symmetrically offset with respect to the center axis of the output end; and
a third output waveguide with a center axis positioned at the output end and symmetrically offset with respect to the center axis of the output end.

13. A method for wavelength locking, comprising:
receiving, by a first waveguide, a first mode of light;

receiving, by a second waveguide, the first mode of light;
generating, by the second waveguide, a second mode of light;
generating an output signal between the first mode of light and the second mode of light; and
using the output signal to wavelength lock a measured wavelength of light to a target wavelength, wherein generating the output signal further comprises:
generating a first output signal corresponding to an interference between a TE00 mode of light and a TE01 mode of light;
generating a second output signal corresponding to the interference between the TE00 mode of light and a TE02 mode of light; and
generating a third output signal corresponding to the interference between the TE01 mode of light and the TE02 mode of light.

14. The method of claim 13, further comprising:
collapsing, by a third waveguide, the first mode of light and the second mode of light into a single mode of light.

15. The method of claim 13, further comprising:
superimposing, by the second waveguide, the first mode of light and the second mode of light while the first and second modes of light propagate through the second waveguide.

* * * * *